(12) United States Patent
Bearson et al.

(10) Patent No.: US 11,889,842 B2
(45) Date of Patent: Feb. 6, 2024

(54) APPARATUSES AND METHODS OF VOLUMETRIC PORTIONING OF FOOD PRODUCTS

(71) Applicant: Tyson Foods, Inc., Springdale, AR (US)

(72) Inventors: Kent Bearson, Naperville, IL (US); Taylor Malott, Downers Grove, IL (US)

(73) Assignee: TYSON FOODS, INC., Springdale, AR (US)

( * ) Notice: Subject to any disclaimer, the term of this patent is extended or adjusted under 35 U.S.C. 154(b) by 479 days.

(21) Appl. No.: 17/228,143

(22) Filed: Apr. 12, 2021

(65) Prior Publication Data
US 2021/0329931 A1 Oct. 28, 2021

Related U.S. Application Data

(60) Provisional application No. 63/016,757, filed on Apr. 28, 2020.

(51) Int. Cl.
*A22C 17/00* (2006.01)

(52) U.S. Cl.
CPC .................................. *A22C 17/002* (2013.01)

(58) Field of Classification Search
CPC ........................... A22C 11/00; A22C 17/0002
USPC .......................................................... 452/157
See application file for complete search history.

(56) References Cited

U.S. PATENT DOCUMENTS 7,521,077 B2 * 4/2009 Azzar ..................... G01F 11/16
452/41
8,662,967 B1 * 3/2014 Blanchard ............ A22C 17/004
452/138

* cited by examiner

*Primary Examiner* — Richard T Price, Jr.
(74) *Attorney, Agent, or Firm* — Duane Morris LLP

(57) ABSTRACT

A volumetric portioning apparatus includes a valve assembly operable in a first position and a second position. The first position of the valve assembly allows a food product to flow from an input hopper through the valve assembly and into a portioning assembly. The second position allows the food product to flow from the portioning assembly, through the valve assembly and into an output receiver. The apparatus further includes an actuator coupled to the valve assembly. The actuator is operable to move the valve assembly from the first position to the second position. The apparatus further includes a knife element operable to automatically cut the food product in the valve assembly to prevent the food product from limiting movement of the valve assembly from the first position to the second position.

20 Claims, 12 Drawing Sheets

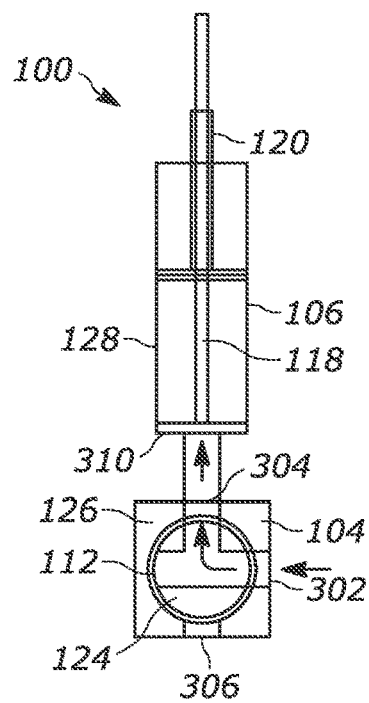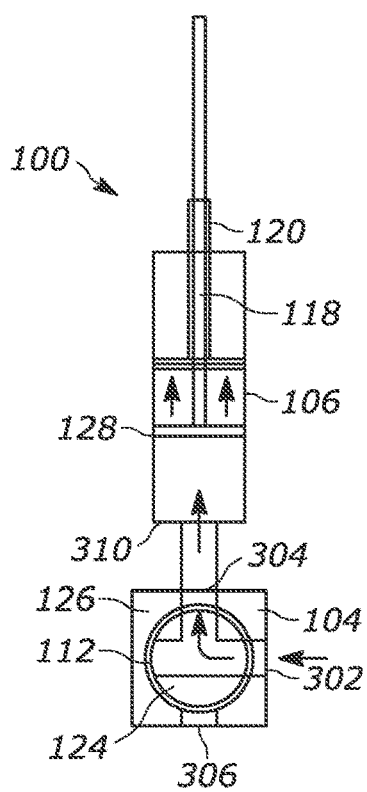
FIG. 3A  FIG. 3B
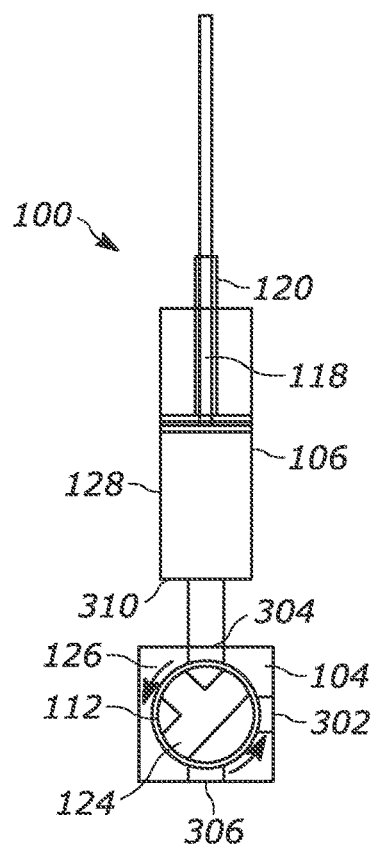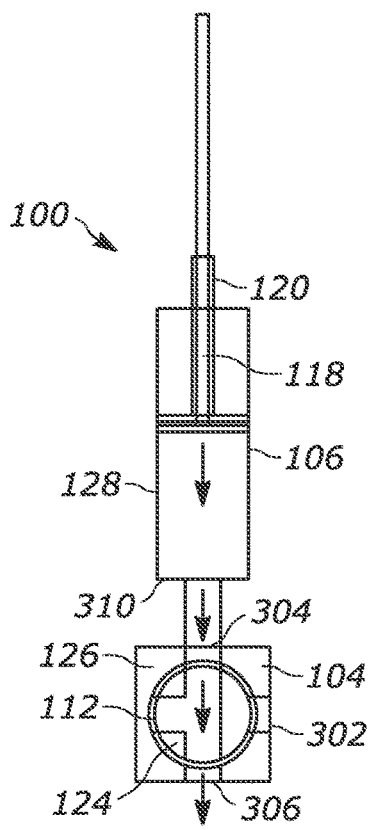
FIG. 3C  FIG. 3D

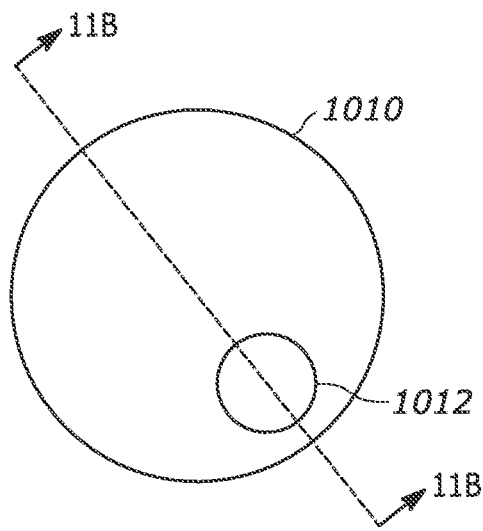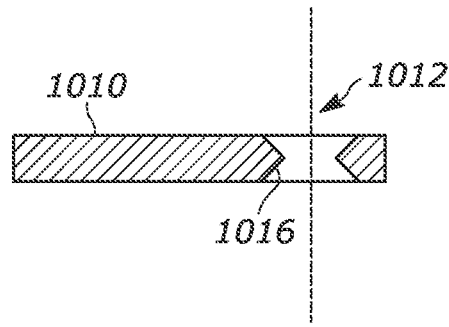
FIG. 11A   FIG. 11B
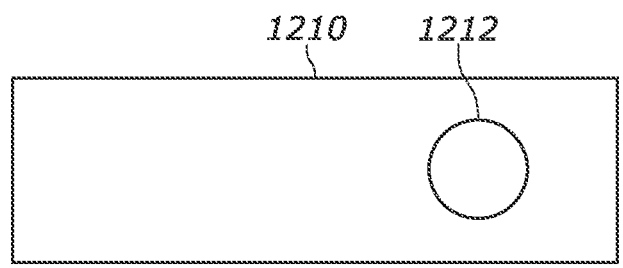
FIG. 12A
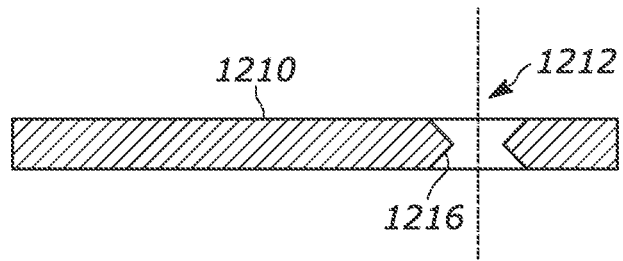
FIG. 12B

APPARATUSES AND METHODS OF VOLUMETRIC PORTIONING OF FOOD PRODUCTS

CROSS-REFERENCE TO RELATED APPLICATIONS

The present application claims the priority benefit of U.S. Provisional App. No. 63/016,757, titled "Apparatuses and Methods of Volumetric Portioning of Food Products", filed on Apr. 28, 2020, the entirety of which is hereby incorporated herein by reference.

FIELD

The present disclosure relates to apparatuses and methods for volumetric portioning of food products. More particularly, the present disclosure relates to apparatuses and methods for volumetric portioning of food products using a valve assembly with a knife element to divide solid portions of the food product that may be located in the valve assembly.

BACKGROUND

This section provides background information related to the present disclosure which is not necessarily prior art.

Various apparatuses and methods allow food producers and/or food processors to separate bulk quantities of food products into predetermined portions. These predetermined portions can then be packaged and provided to retailers for sale to consumers. In some instances, it can be desirable to separate such bulk quantities of food products into predetermined volumes of the food product. One type of food product that can be volumetrically portioned into a predetermined volume is meat and meat products. Meat products, in some portioning methods, can be macerated and/or emulsified into a slurry in combination with a liquid. In these types of portioning methods, the macerated and/or emulsified meat products can be conveyed through conduits and dispensed into predetermined volumes. In other portioning methods, meat products can be ground or can be pre-cut into small pieces (e.g., pieces less than one pound in weight) prior to being introduced into the portioning process. In these methods, the pre-cut meat products can be moved through conduits and dispensed into predetermined volumes as well.

These portioning methods can have drawbacks and/or can be unsuitable for dispensing all types of meat products. One type of meat product that can be unsuitable for use in existing portioning methods are meat products that include whole muscle portions. Such meat products with whole muscle portions can have chunks or pieces of muscle that are larger than one pound in weight. Such chunks or pieces of muscle can present difficulties for existing portioning methods and apparatuses. In some instances, these portioning methods can become clogged or can be damaged when whole muscle meat products or other types of meat products are introduced into the portioning process. Another drawback exists in that these portioning methods can require pre-processing of meat products (e.g., pre-cutting) before introducing meat products into the portioning process. In still other instances, existing portioning process have little or no automation and can be labor intensive and slower than automated processing methods. There exists a need, therefore, for improved volumetric portioning methods and processes that are faster, less costly, require less repair and maintenance and can accurately and repeatably dispense food products into predetermined volumes of product.

SUMMARY

This section provides a general summary of the disclosure, and is not a comprehensive disclosure of its full scope or all of its features.

In some embodiments in accordance with the present disclosure, a volumetric portioning apparatus includes a valve assembly operable in a first position and a second position. The first position of the valve assembly allows a food product to flow from an input hopper through the valve assembly and into a portioning assembly. The second position allows the food product to flow from the portioning assembly, through the valve assembly and into an output receiver. The apparatus further includes an actuator coupled to the valve assembly. The actuator is operable to move the valve assembly from the first position to the second position. The apparatus further includes a knife assembly that is operable to automatically cut the food product in or near the valve assembly to prevent the food product from limiting movement of the valve assembly from the first position to the second position.

In some embodiments in accordance with the present disclosure, a method of portioning a food product includes moving the food product from an input hopper through a valve assembly and into a portioning assembly while the valve assembly is operating in a first position. The method further includes moving the valve assembly from the first position to a second position and cutting the food product in or near the valve assembly to prevent the food product from limiting movement of the valve assembly from the first position to the second position. The method further includes moving the food product from the portioning assembly through the valve assembly and into an output receiver when the valve assembly is operating in the second position.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 4:
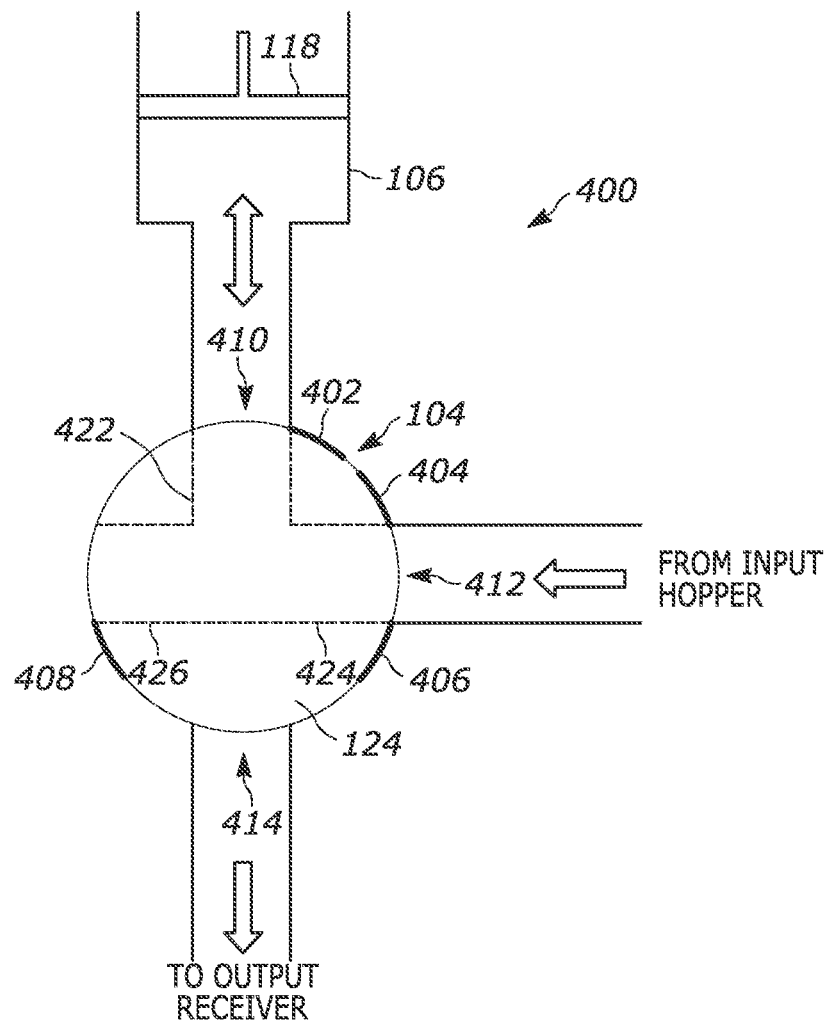
Figure 5:
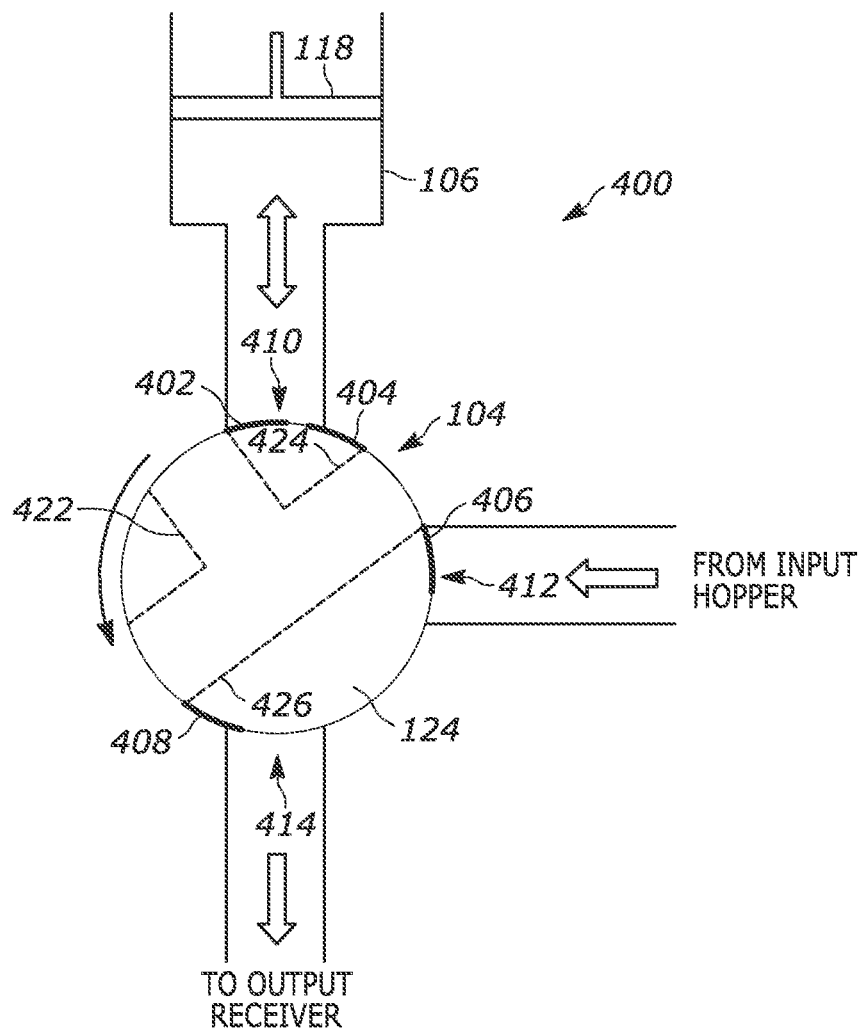
Figure 6:
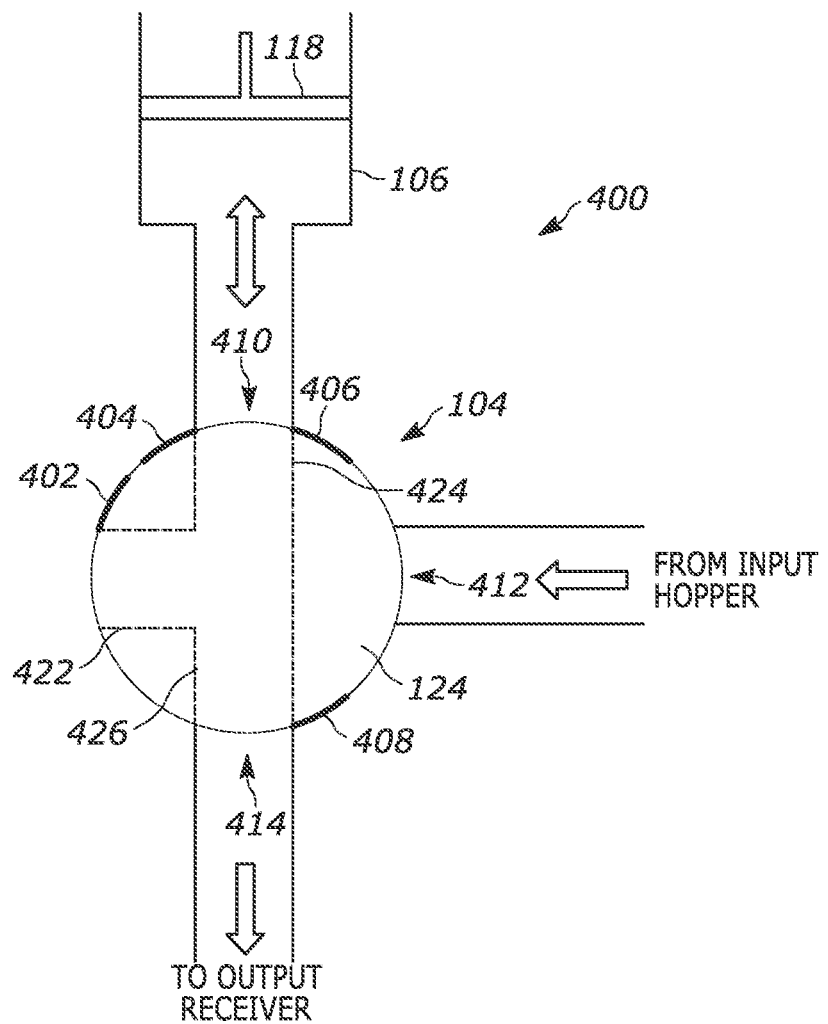
Figure 7:
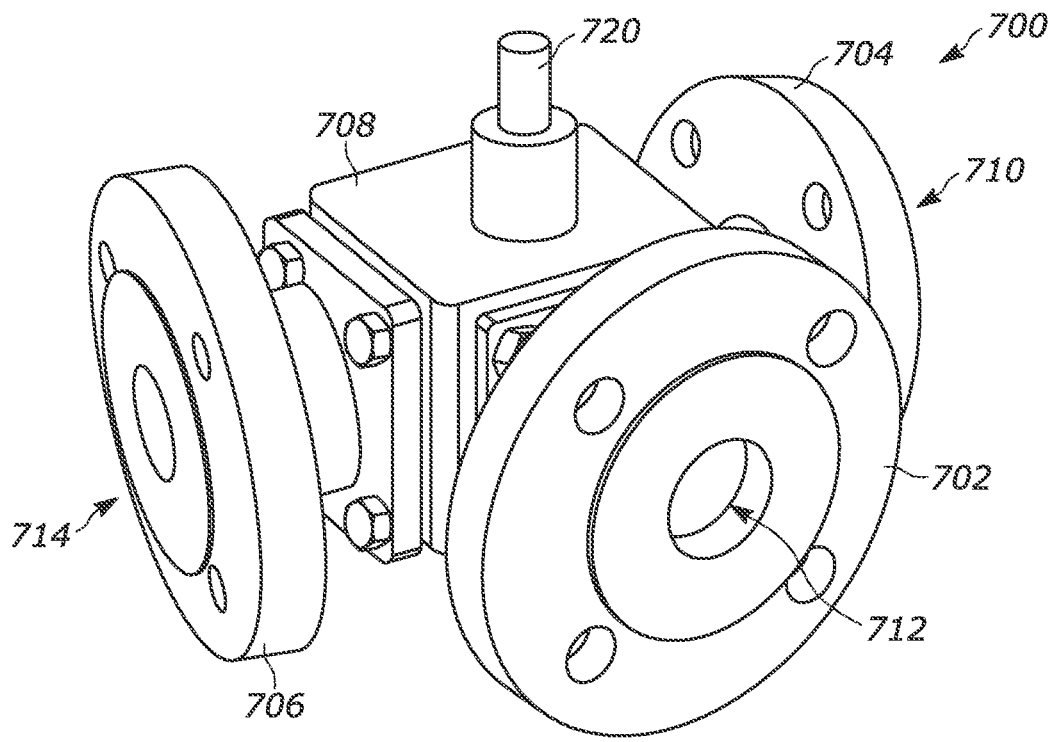
Figure 8:
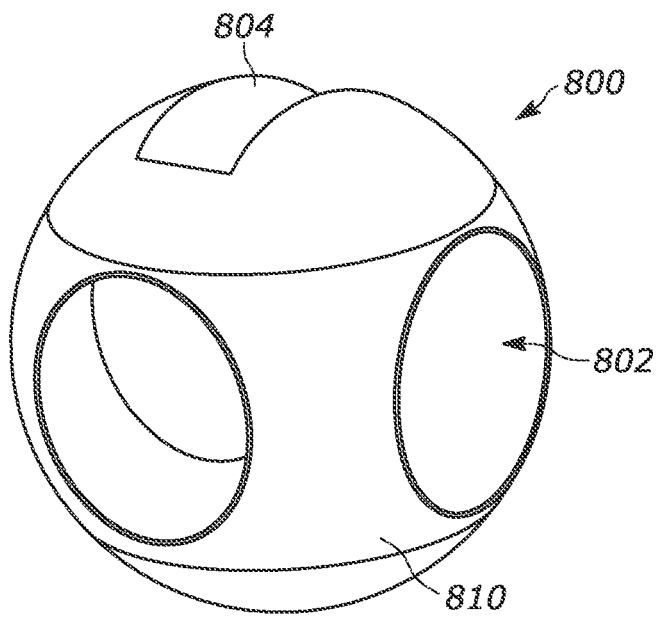
Figure 9:
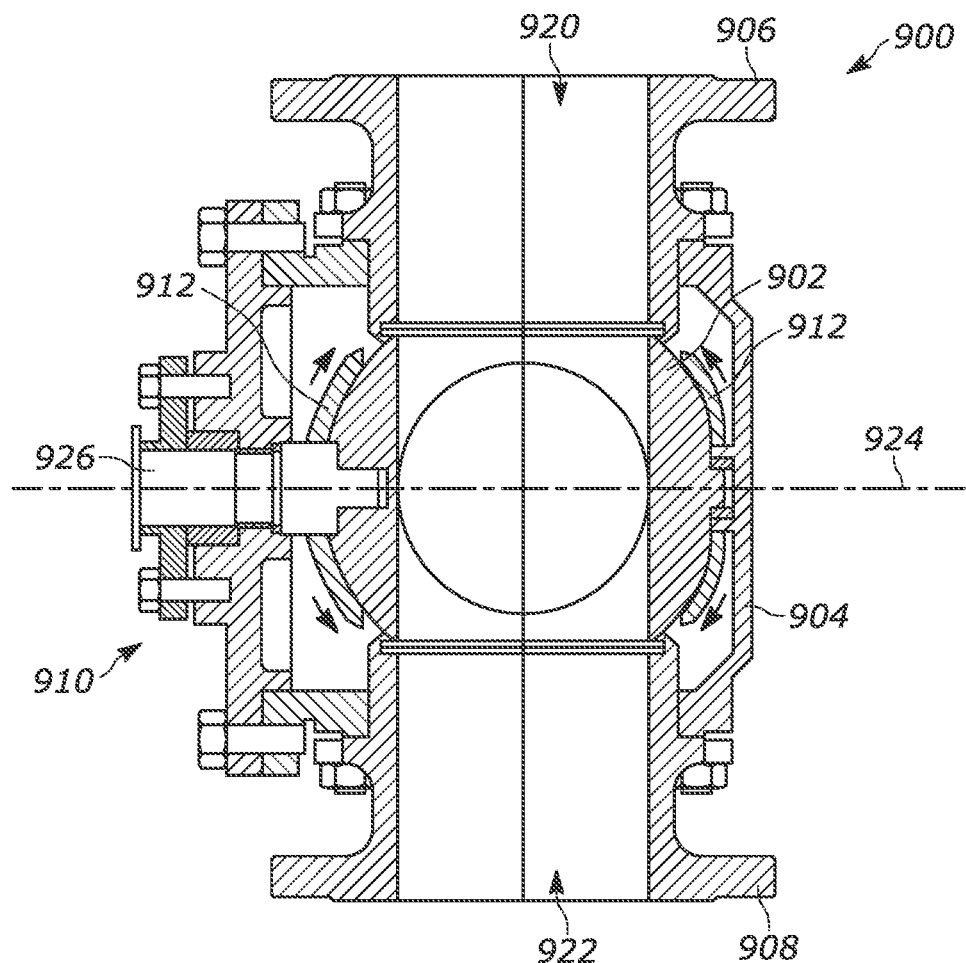
Figure 10:
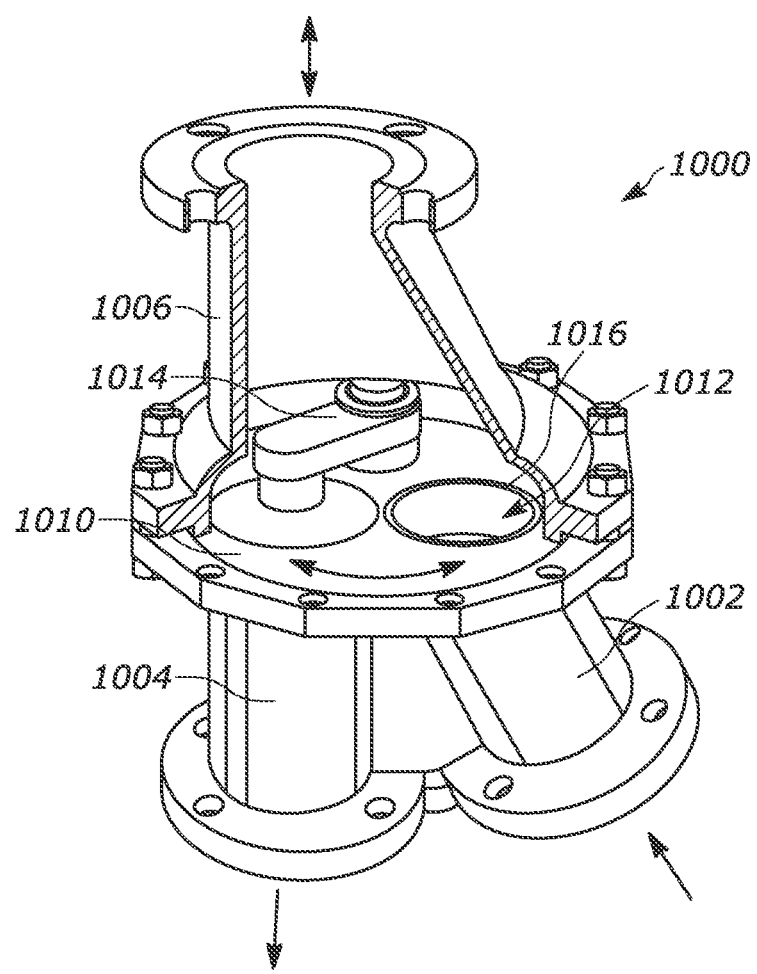
Figure 13:
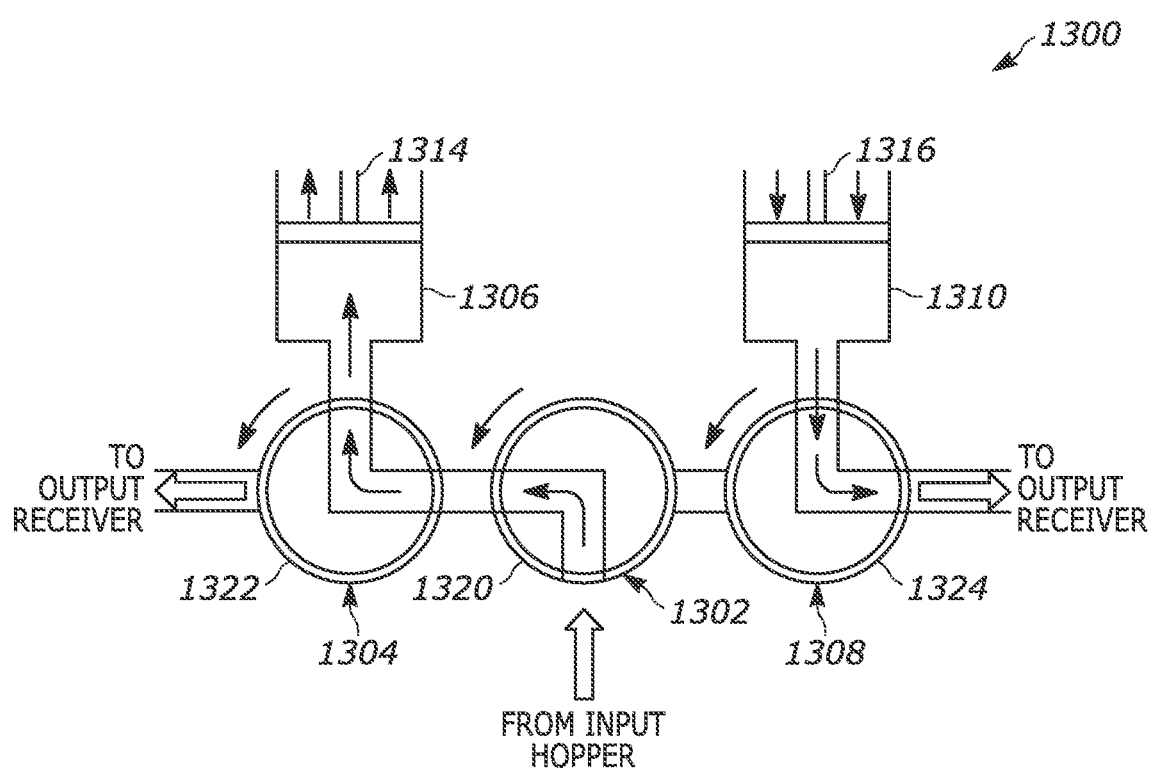

FIGS. 3A-G are illustrations of another example volumetric portioning apparatus in various positions during a cycle of a portioning process in accordance with some embodiments of the present disclosure;

FIG. 4 is an illustration of another example volumetric portioning apparatus in an inflow position during a portioning process in accordance with some embodiments of the present disclosure;

FIG. 5 is an illustration of the volumetric portioning apparatus of FIG. 4 in a transition position during a portioning process;

FIG. 6 is an illustration of the volumetric portioning apparatus of FIG. 4 in a dispensing position during a portioning process;

FIG. 7 is an illustration of an example valve assembly that can be used in a volumetric portioning apparatus in some embodiments of the present disclosure;

FIG. 8 is an illustration of an example ball with an example blade that can be used in a ball valve assembly in some embodiments of the present disclosure;

FIG. 9 is a cross-sectional illustration of another example valve assembly that can be used in a volumetric portioning apparatus in some embodiments of the present disclosure;

FIG. 10 is a sectional illustration of another example valve assembly that can be used in a volumetric portioning apparatus in some embodiments of the present disclosure;

FIG. 11A is a top view of an example diverter plate that can be used in the valve assembly of FIG. 10;

FIG. 11B is a side cross-sectional illustration of the diverter place of FIG. 11A;

FIG. 12A is a top view of another example diverter plate that can be used in a valve assembly in some embodiments of the present disclosure;

FIG. 12B is a side cross-sectional illustration of the diverter plate of FIG. 12A; and FIG. 13 is an illustration of another example volumetric portioning apparatus using multiple valve assemblies that operate together to provide continuous flow of food product.

Corresponding reference numerals indicate corresponding parts throughout the several views of the drawings.

DETAILED DESCRIPTION

Example embodiments will now be described more fully with reference to the accompanying drawings. For purposes of the description hereinafter, it is to be understood that the embodiments described below may assume alternative variations and embodiments. It is also to be understood that the specific articles, compositions, and/or processes described herein are exemplary and should not be considered as limiting. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

The apparatuses and methods of the present disclosure allow food products that contain large chunks or solid pieces of material to be measured and dispensed into predetermined portions. In some examples, the apparatuses and methods of the present disclosure can measure and dispense whole muscle meat products into predetermined volumes of meat product. In other examples, other food products (e.g., processed foods, vegetables, prepared foods, etc.) can be measured and dispensed using the apparatuses and methods of the present disclosure.

In the present disclosure, the term whole muscle meat product is used to describe a food product that includes pieces of meat muscle that have sizes large enough to bridge across moving parts of the volumetric portioning apparatus. In some examples, such pieces of meat muscle can be pieces having a weight of more than one pound. In other examples, such pieces of meat muscle can have a weight of more than two pounds. In still other examples, such pieces of meat muscle can have a weight of more than three pounds. In yet other examples, such pieces of meat muscle can have a weight of more than five pounds and in some instances can be as large as twenty pounds.

As can be appreciated, pieces of whole meat muscle having the sizes as previously described are often pre-processed before being introduced into existing or traditional volumetric portioning processes. For example, a meat processing worker may cut these large pieces of meat muscle into smaller sizes that are then introduced in existing volumetric portioning processes. This pre-processing can be necessary to prevent existing volumetric portioning processes from being clogged or damaged from the large pieces of meat muscle as the large pieces travel through the processing equipment.

The apparatuses and methods of the present disclosure reduce or minimize the need for pre-processing of meat muscle before the meat muscle pieces are introduced into the volumetric portioning equipment. The apparatuses and methods of the present disclosure can include a knife element or other separator that can cut and/or separate the whole muscle meat product as needed to prevent the processing equipment from damage or blockage. In some examples, the knife element or other separator can be included in a valve assembly in the volumetric portioning apparatus as will be described further below.

Figure 1:
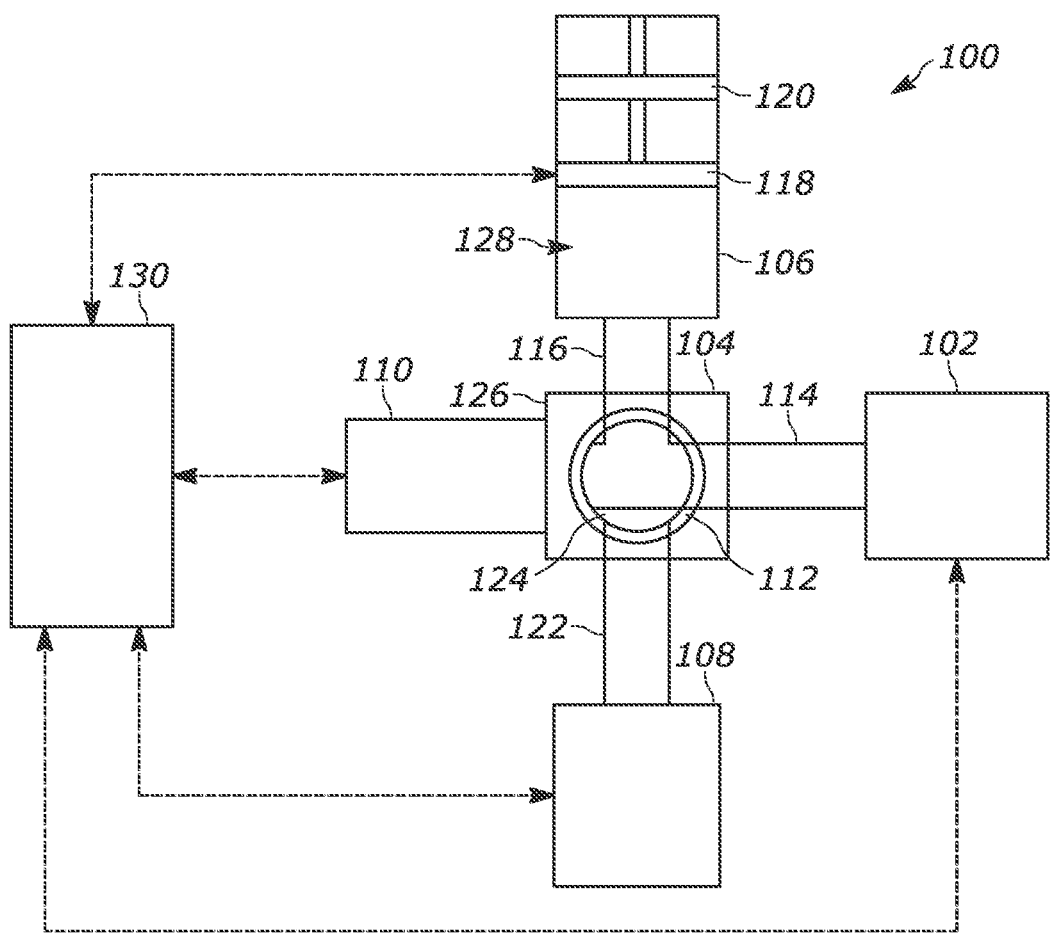
FIG. 1 is a schematic of a volumetric portioning apparatus in accordance with some examples of the present disclosure.

Turning now to FIG. 1, an example volumetric portioning apparatus 100 is shown. The volumetric portioning apparatus 100, in this example, includes input hopper 102, valve assembly 104, portioning assembly 106, output receiver 108, actuator 110, knife element 112 and portioning controller 130. The input hopper 102 can be fluidly connected to the valve assembly 104 by the inflow conduit 114. The valve assembly 104 can be fluidly connected to the portioning assembly 106 by the portioning conduit 116 and to the output receiver 108 by the outflow conduit 122. In this configuration, meat muscle that is positioned in the input hopper 102 can move from the input hopper 102 to the valve assembly 104 and to the portioning assembly 106. The meat muscle can also flow from the valve assembly 104 and from the portioning assembly 106 to the output receiver 108 through the portioning conduit 116 and the outflow conduit 122.

The inflow conduit 114, the portioning conduit 116 and the outflow conduit 122 can be any suitable pipe or other conveyance path of suitable size and material for the product that may flow from one element to the next. In the context of meat muscle, the conduits can be stainless steel pipe having internal diameters of three inches or more. In other examples, the conduits 114, 116, 122 can have internal diameters of five inches or more. In still other examples, the conduits 114, 116, 122 have internal diameters of six inches or more. As shown in the example of FIG. 1, the input hopper 102, the valve assembly 104, the portioning assembly 106 and the output receiver 108 are separated by the respective conduits 114, 116, 122 as previously explained. In other examples, the input hopper 102, the valve assembly 104, the portioning assembly 106 and the output receiver 108 can be connected directly together without a separate conduit disposed therebetween.

The input hopper 102 can be any suitable container that can hold a quantity of meat muscle to be portioned using the volumetric portioning apparatus 100. The input hopper 102 can have any suitable shape such as a cylinder, cone, rectangular prism, or funnel to hold the quantity of meat muscle. The input hopper 102 can have sloped walls or other features to guide the meat muscle toward the inflow conduit 114 and/or the valve assembly 104.

While not shown, the volumetric portioning apparatus 100 can include a pump, auger or other element to move the meat muscle into the input hopper 102 and/or through the inflow conduit 114. For example, a screw-type auger can be positioned at the base of the input hopper 102 to move meat muscle into the inflow conduit 114.

The valve assembly 104 can be any suitable valve assembly that can operate in a first position in which meat muscle can flow from the input hopper 102 into the portioning assembly 106 and in a second position in which meat muscle can flow from the portioning assembly 106 into the output receiver 108. In the example shown in FIG. 1, the valve assembly 104 is a rotary type valve such as a ball valve assembly. In other examples, other types of valve assemblies can be used.

As shown in FIG. 1, the valve assembly 104 is positioned in the first position in which the rotary portion 124 of the valve assembly 104 fluidly connects the inflow conduit 114 with the portioning conduit 116. As can be appreciate and as will be further explained, the rotary portion 124 of the valve assembly 104 can rotate relative to the valve body 126 to the second position. In the second position, the rotary portion 124 can fluidly connect the portioning conduit 116 to the outflow conduit 122.

The actuator 110 can be operatively connected to the valve assembly 104. The actuator 110 can be any suitable device operable to move the valve assembly 104 from the first position to the second position and then return the valve assembly 104 from the second position back to the first position. In some examples, the actuator 110 can be a servo drive, a pneumatic cylinder, solenoid, linear actuator, motor or the like.

The valve assembly 104 also can include the knife element 112. The knife element 112 can be positioned between the rotary portion 124 and the body portion (or valve body) 126 in the valve assembly 104. The knife element 112 can be one or more blades that can be operable to cut meat muscle that is positioned at the intersection of the rotary portion 124 and the body portion 126 in the valve assembly 104. The knife element 112 can be made of any suitable material that is durable and can have a sharpened edge to cut the meat muscle. In one example, the knife element 112 is made of a suitable steel such as stainless steel or the like. The knife element 112 can be connected to the rotary portion 124 and/or to the actuator 110. In this manner, the knife element 112 can be moved with the rotary portion 124 to cut the meat muscle as the rotary portion 124 is moved from the first position to the second position as previously described. In other examples, the knife element 112 can be connected to a second actuator (not shown) or via other suitable mechanical connection to allow the knife element 112 to move independently from the rotary portion 124 or in a direction opposite to the rotary portion 124. In some examples, the rotary portion 124 can move in a counter-clockwise direction while the knife element 112 can move in a clockwise direction or vice versa.

The knife element 112 can be positioned at each of the inlet or outlet ports of the valve body 126 of the valve assembly 104. In this manner, the knife element 112 can cut meat muscle that may be located at or near the intersection of the inflow conduit 114 with the valve body 126, the intersection of the portioning conduit 116 with the valve body 126 and/or the outflow conduit 122 with the valve body 126.

The portioning assembly 106 can be any suitable mechanism for measuring and dispensing the meat muscle product that is moved through the volumetric portioning apparatus 100. In the example shown, the portioning assembly 106 can include receptacle 128, a piston 118 and a volume adjuster 120. The receptacle 128, in the example shown, is a cylindrical container that can hold quantities of meat muscle that flow into the portioning assembly 106. Other shapes for receptacle 128, e.g., cuboid, rectangular cuboid, etc., are contemplated by the present disclosure. The piston 118 can include a plate attached to a rod that moves the plate in the receptacle 128. In this manner, the piston 118 can draw meat muscle into the receptacle when the piston 118 moves upward as shown in FIG. 1 and then push meat muscle out of the receptacle 128 when the piston 118 moves downward as shown in FIG. 1.

The volume adjuster 120 can be similar to the piston 118 in configuration. The volume adjuster 120, however, can be positioned as desired in the receptacle 128 but does not move with each portion of meat muscle that is dispensed from the volumetric portioning apparatus 100. Instead, the volume adjuster 120 can be positioned as desired and remains in such position during normal operation of the portioning apparatus 100. The volume adjuster 120 can be moved to adjust for a desired portion size and can also be removed from the receptacle 128 for the cleaning or maintenance of the portioning assembly 106 and/or the piston 118. Additionally and/or alternatively, the volume adjuster 120 may be positioned and/or calibrated to measure a predetermined weight of meat muscle.

As further shown in FIG. 1, the portioning controller 130 can be any suitable micro-controller, programmable logic controller or computing device that can be used to control the operation of the volumetric portioning apparatus 100. As shown, the portioning controller 130 can be electrically coupled to each of the input hopper 102, the portioning assembly 106, the output receiver 108, and/or the actuator 110. The portioning controller 130 can be electrically coupled to such elements of the volumetric portioning apparatus 100 using any suitable wired or wireless communication.

The portioning controller 130 can include various control elements, graphical user interfaces, and output displays to allow users to adjust the volumetric portioning apparatus 100 and to control various parameters of the volumetric portioning apparatus 100 such as flow rate, portion size, piston force, piston speed, valve positioning speed, knife element positioning speed, actuator power, and the like.

The operation of the volumetric portioning apparatus 100 can operate to dispense a predetermined portion of a meat product (e.g., by weight or volume). For example, a meat product such as a whole muscle meat product can be introduced into the input hopper 102. The meat product can move from the input hopper 102 through the inflow conduit 116 and into the valve assembly 104. The valve assembly 104 can be positioned in the first position (as shown in FIG. 1). In the first position, the valve assembly 104 directs or allows the meat product to move from the valve assembly 104 through the portioning conduit 116 and into the portioning assembly 106. The piston 118 can move toward the volume adjuster 120 to allow the meat product to fill the receptacle 128 of the portioning assembly 106.

When the receptacle 128 of the portioning assembly 106 is filled with a desired quantity of meat product, the movement of the meat product into the receptacle can stop. The quantity of meat product in the receptacle 128 can be sensed by a sensor (e.g., proximity sensor, force sensor, etc.) to determine whether the quantity is sufficient. The signal from the sensor can, in turn, be received by the portioning controller 130. In other examples, other suitable sensors or control methods can be used to determine when the receptacle 128 has been filled with the meat product.

The portioning controller 130 can then cause the actuator 110 to move the valve assembly 104 from the first position to the second position. In the second position (not shown in FIG. 1), the rotary portion 124 can rotate such that the rotary portion 124 is in a position ninety degrees counter-clockwise from the position shown in FIG. 1. In such a position, the rotary portion 124 fluidly connects the portioning assembly 106 to the outflow conduit 122. Additionally, the input hopper 102 and/or the inflow conduit 114 are not fluidly connected to either the portioning assembly 106 or the outflow conduit 122.

During or before the rotary portion 124 of the valve assembly 104 moves to the second position, the knife element 112 can also rotate to cut or separate any pieces of the meat product that may bridge across the location or intersection of the rotary portion 124 and the body portion 126. The portioning controller 130 can send a signal to the actuator 110 or other actuator/motor to cause the movement of the knife element 112. As can be appreciated, if pieces of meat product are bridging across the rotary portion 124 and the body portion 126 when the rotary portion 124 is moved, the rotary portion 124 can be blocked from moving and/or can be blocked from moving completely to its intended position. Thus, the knife element 112 moves in the flow path of the meat product to cut the meat product or separate the bridging pieces of the meat product to allow the rotary portion 124 to move from the first position to the second position. As discussed above, the knife element 112 can move in the same, opposite or different directions from the rotary portion 124. In addition, different sections of the knife element 112 can move in different directions from each other to cut or separate pieces of meat product that can be an obstacle to the movement of the rotary portion 124.

After the valve assembly 104 has moved from the first position to the second position, the meat product can move from the portioning assembly 106 through the valve assembly 104 and into the output receiver 108. In order to induce movement of the meat product in this manner, the piston 118 can move toward the valve assembly 104. The piston 118 can push the meat product from the receptacle 128 through the valve assembly 104 and into the output receiver 108. Since the size of the receptacle 128 is known and the stroke of the piston 118 is known, the portioning assembly 106 can move a known quantity (based on weight or volume) of meat product into the output receiver 108.

The portioning assembly 106 can include further sensors and/or control devices (e.g., proximity sensors, force sensors, hall sensors, etc.) to determine when the piston 118 has moved a predetermined distance or stroke. The portioning controller 130 can receive signals from such sensors and/or control devices to determine that the desired quantity or volume of meat product has been moved into the output receiver 108.

After such volumetric portioning has occurred, the portioning controller 130 can cause the volumetric portioning apparatus 100 to return to its original or first position. Before the valve assembly 104 returns to the first position, however, the portioning controller 130 can cause the knife element 112 to again cut or separate pieces of meat product that may be bridging across the moving parts of the valve assembly 104 (i.e., the rotary portion 124 and the body portion 126). The knife element 112 can move in any suitable manner as previously described to minimize and/or prevent the valve assembly 104 from being damaged or being restricted from moving from the second position back to the first position.

Once the volumetric portioning apparatus 100 has returned to the original (or first) position, the method described above can be repeated to again measure and dispense a predetermined quantity or volume of meat product. The volumetric portioning apparatus 100 can be operated repeatedly to continue measuring and dispensing quantities of meat product. As can be appreciated, the volumetric portioning apparatus 100 has many advantages over existing portioning processes. The volumetric portioning apparatus does not require meat products, such as whole muscle meat products, from being pre-cut and/or separated into pieces that would otherwise become clogged in or damage existing portioning processes. Thus, the volumetric portioning apparatus 100 can operate more quickly, with less user interaction, with less repair and maintenance and less cost than existing portioning processes.

Figure 2:
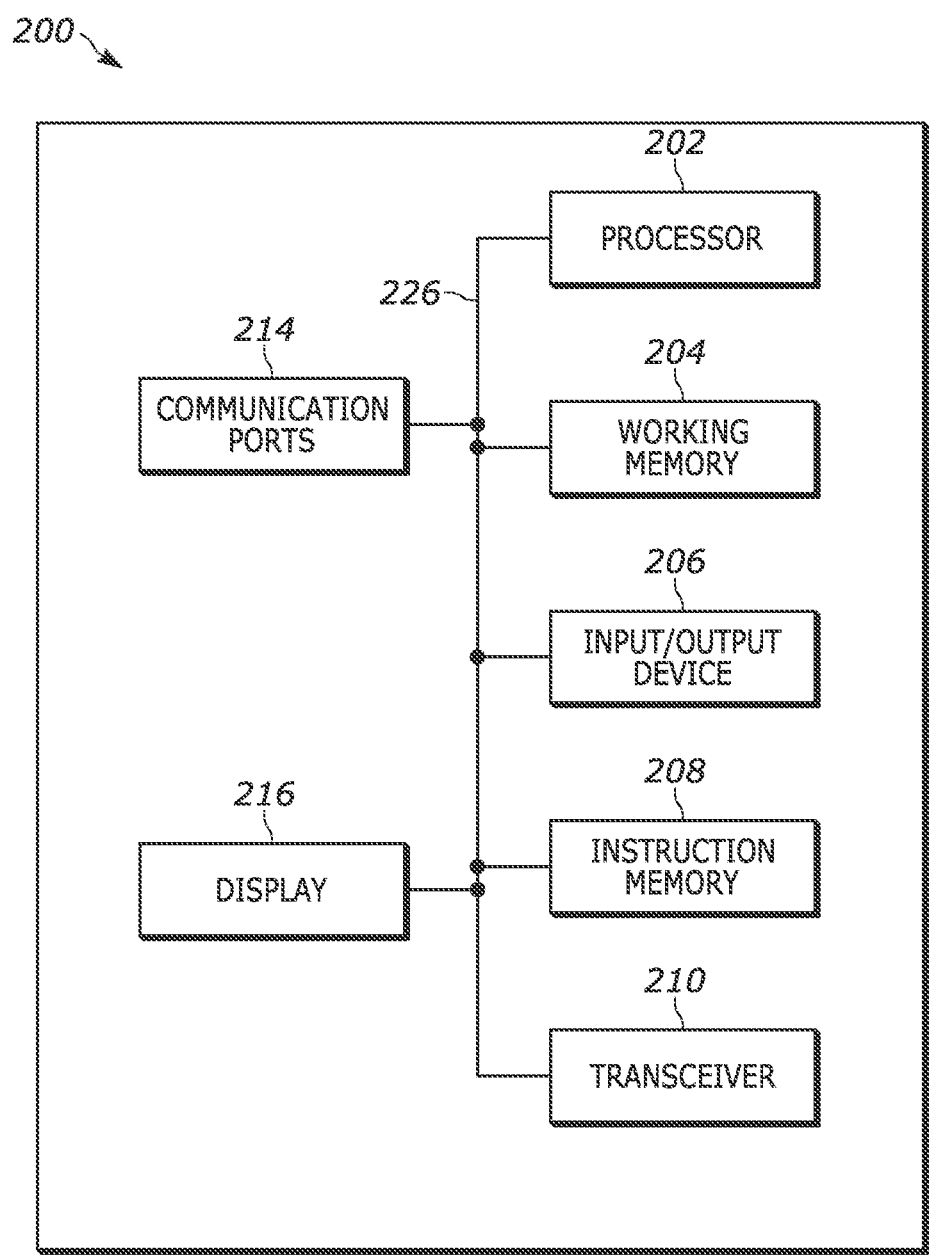
FIG. 2 is an illustration of an example computing device that can be used in connection the volumetric portioning apparatus of FIG. 1.

Turning now to FIG. 2, an example computing device 200 is shown. The portioning controller 130 shown in FIG. 1 or other controllers or computing devices described in the present disclosure can include the elements shown in FIG. 2 and described below.

Computing device 200 can include one or more processors 202, working memory 204, one or more input/output devices 206, instruction memory 208, a transceiver 210, one or more communication ports 214, and a display 216. The foregoing elements can be coupled to each other with one or more data buses 226. The data buses 226 can include wired or wireless communication channels.

Processors 202 can include one or more distinct processors, each having one or more cores. Each of the distinct processors can have the same or different structure. Processors 202 can include one or more central processing units (CPUs), one or more graphics processing units (GPUs), application specific integrated circuits (ASICs), digital signal processors (DSPs), and the like. The processors 202 can be configured to perform a certain function or operation by executing code, stored on instruction memory 208, embodying the function or operation. For example, processors 202 can be configured to perform one or more of any function, method, or operation disclosed herein.

Instruction memory 208 can store instructions that can be accessed (e.g., read) and executed by processors 202. For example, the instruction memory 208 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 202 can store data to, and read data from, working memory 204. For example, processors 202 can store a working set of instructions to working memory 204, such as instructions loaded from instruction memory 208.

The processors 202 can also use working memory 204 to store dynamic data created during the operation of the computing device 200. Working memory 204 can be a random access memory (RAM) such as a static random access memory (SRAM) or dynamic random access memory (DRAM), or any other suitable memory.

Input-output devices 206 can include any suitable device that allows for data input or output. For example, input-output devices 206 can include one or more of a keyboard, a touchpad, a mouse, a stylus, a touchscreen, a physical button, a speaker, a microphone, or any other suitable input or output device.

Communication port(s) 214 can include, for example, a serial port such as a universal asynchronous receiver/transmitter (UART) connection, a Universal Serial Bus (USB) connection, or any other suitable communication port or connection. In some examples, communication port(s) 214 allows for the programming of executable instructions in instruction memory 208. In some examples, communication port(s) 214 allow for the transfer (e.g., uploading or downloading) of data, such as instructions or parameters for the desired size of meat products or other operating parameters of the volumetric portioning apparatus 100.

Display 216 can display, for example, graphical user interfaces. User interfaces can enable user interaction with computing device 200. For example, user interface 224 can be a user interface to allow for the control, change or input of operating parameters of the volumetric portioning apparatus 100. In some examples, a user can interact with the user interface or display 216 by engaging input-output devices 206. In some examples, display 216 can be a touchscreen, where the user interfaces are displayed on the touchscreen.

Transceiver 210 allows for communication with a network, such as the internet or other suitable wide-area or local network. The network can be any suitable communication network that permits the transfer of data. The network, for example, can be a cellular network such as a 3G, 4G or 5G network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. For example, if the volumetric portioning apparatus 100 is connected to the internet, transceiver 210 is configured to allow communications with the internet. In some examples, transceiver 210 is selected based on the type of communication network the computing device 200 will be operating in. Processor(s) 202 is operable to receive data from, or send data to the network via transceiver 210.

As shown in FIG. 1, a single computing device (i.e., the portioning controller 130) is shown. In other examples, the volumetric portioning apparatus 100 can include more than one computing device and can include multiple computing devices with one or more elements shown in FIG. 2 to allow instructions, signals and/or other communications to be transmitted, received and/or performed by the volumetric portioning apparatus 100.

Turning now to FIGS. 3A-3G, an example volumetric portioning apparatus 100 is shown in various stages of operation. As can be seen, the valve assembly 104 and the portioning assembly 106 are shown. As can be appreciated, the volumetric portioning apparatus 100 of FIGS. 3A-3G can include the other elements shown in FIG. 1 or as otherwise described herein.

In a first stage of operation, the apparatus 100 can have the configuration as shown in FIG. 3A. In this configuration, the rotary portion 124 is positioned relative to the body portion 126 of the valve assembly 104 such that the input port 302 is fluidly connected to the portioning port 304. The dispensing port 306 is closed or not fluidly connected at this stage with the other flow paths of the volumetric portioning apparatus 100. As can be seen, meat product that may be introduced into the volumetric portioning apparatus 100 can flow from the input port 302 to the portioning port 304 and into the portioning assembly 106.

In the first stage of operation, the piston 118 of the portioning assembly 106 can be positioned in a dispensed position in which the plate of the piston is located at or near a base 310 of the receptacle 128. In the dispensed position, the piston 118 prevents the filling of the receptacle with meat product. The piston 118 may be positioned in the dispensed position prior to a filling position of the piston 118. The piston 118 may be positioned in the dispensed position, for example, after the portioning assembly 106 has dispensed meat product to the output receiver (not shown).

The volumetric portioning apparatus 100 can move from the first stage of operation to the second stage of operation shown in FIG. 3B. In the second stage, the meat product can flow through the valve assembly 104 and into the receptacle 128 of the portioning assembly 106. To induce the flow of meat product and/or in combination with the flow of meat product, the piston 118 can move in a filling direction (i.e., in a direction away from the base 310). As such movement occurs, the meat product can flow into and fill the receptacle 128. During the second stage of operation, the valve assembly remains in the first position to allow the flow of the meat product through the valve assembly 104 and into the portioning assembly 106.

In a third stage of operation as shown in FIG. 3C, the knife element 112 can move relative to the body portion 126 of the valve assembly 104 to cut and/or separate pieces of meat muscle product that may be bridging across the rotary portion 124 and the body portion 126. The knife element 112 can move in any suitable direction as previously described. After or concurrently with the movement of the knife element 112, the rotary portion 124 can move relative to the body portion 126. During the third stage of operation, the meat product is not flowing through the valve assembly 104 or the portioning assembly 106.

Once the rotary portion 124 has moved from the first position to the second position, the volumetric portioning apparatus 100 can be configured as shown in FIG. 3D. As shown, in this fourth stage of operation, the rotary portion 124 is positioned to fluidly connect the portioning port 304 to the dispensing port 306. The input port 302 is closed or not fluidly connected to the portioning assembly 106 in the fourth stage of operation. To induce or in combination with the flow of meat product from the receptacle toward the dispensing port 306, the piston 118 may begin to move toward the base 310.

Figures 3E, 3F:
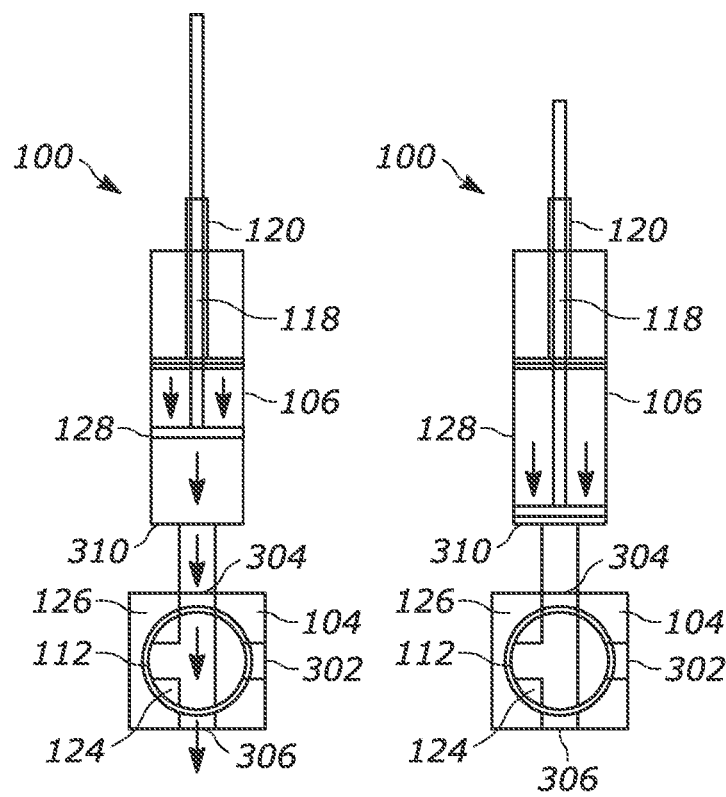

As shown in FIG. 3E, the volumetric portioning apparatus 100 can dispense meat product in a fifth stage of operation. In the configuration as shown, the piston is moving in a dispensing direction toward the base 310. As the piston 118 moves toward the base 310 in the receptacle 128, the meat product located in the receptacle moves out of the receptacle 128 and through the valve assembly 104 and into the output receiver (not shown). As can be appreciated, the rate at which the meat product is dispensed can be controlled by controlling the force and/or the rate of travel that the piston 118 toward the base 310.

The volumetric portioning apparatus 100 can be configured in a sixth stage of operation as shown in FIG. 3F. In the sixth stage of operation the piston 118 has travelled a desired distance and has moved a predetermined quantity (e.g., weight or volume) of meat product out of the portioning assembly 106. In this manner, repeatable and measured volumes of meat product can be dispensed.

Figure 3G:
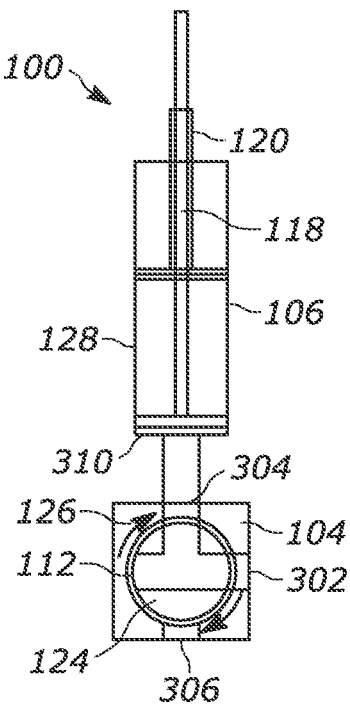

As shown in FIG. 3G, the volumetric portioning apparatus 100 can return to its original configuration in a seventh stage of operation. In the seventh stage of operation, the valve assembly 104 can move from the second position back to the first position. The rotary portion 124 can rotate and return to its original position in which the input port 302 is fluidly connected to the portioning port 304. In addition, the knife element 112 also moves prior to or concurrently with the rotary portion 124 to cut and/or separate any pieces of meat product that may be bridging across the rotary portion 124 and the body portion 126. Thus, the volumetric portioning apparatus 100 can be returned to its original position and the sequence of stages previously described can be repeated for repeated dispensing of a predetermined quantity of meat product.

The knife element 112 of the volumetric portioning apparatus can be configured in any suitable manner to cut and/or separate meat product that may bridge across elements of the apparatus that may move relative to one another. As shown in the example of FIG. 4, a volumetric portioning apparatus 400 may include a knife element that includes multiple cutting edges 402, 404, 406, 408. In this example, the knife element can include a first edge 402, a second edge 404, a third edge 406 and a fourth edge 408. As will be explained further, the edges 402, 404, 406, 408 can be positioned at predetermined locations to allow the meat product to be cut at locations at or near the conduits that may lead into or out of the valve assembly 104.

As shown in FIG. 4, the valve assembly 104 can be positioned in the first position with the rotary portion 124 fluidly connecting a flow path from the input hopper to the portioning assembly. In this example, the rotary portion 124 defines a cavity with a T-shape that facilitates the fluid connections in the first position and in the second position. The T-shaped cavity 420 can include a first leg 422, a second leg 424 and a third leg 426. The first leg 422 can be disposed in a substantially perpendicular position with respect to the second leg 424 and the third leg 426. In other examples, the rotary portion 124 can have other configurations and can define cavities with other shapes.

In the first position, the first edge 402 can be located adjacent the portioning port 410. The second edge 404 can be located adjacent the input port 412. The third edge can be located adjacent the input port 412 but on an opposite side of the input port 412 from the second edge. The fourth edge 408 can be located on an opposite side of the valve assembly 104 at or near the third leg 426.

When the valve assembly 104 moves to the second position, the first leg 422, the second leg 424 and the third leg 426 can rotate. Concurrently or prior to the legs, 422, 424, 426 rotating, the edges 402, 404, 406, 408 can also rotate or move to cut the meat product that may be bridging across the ports 410, 412, 414. In an embodiment, one or more of the cutting edges 402, 404, 406, and/or 408 may initially be extended beyond the opening of the respective legs 422, 424, and/or 426, prior to the rotation of the valve assembly, so that the cutting edge leads the trailing edge of the opening of the respective leg during rotation. In this manner, the cutting edge will be positioned to cut through any bridging muscle meat prior to the bridging muscle meat obstructing the rotation of the valve assembly. The extended cutting edge(s) may then be retracted at a suitable point of rotation of the valve assembly. As shown in FIG. 5, the valve assembly 104 is positioned in an intermediate position between the first position (FIG. 4) and the second position (FIG. 6).

In the illustrated intermediate position, the first edge 402 has moved across the portioning port 410 and cut meat product that may have been positioned in the portioning port 410. The third edge 406 has moved across the input port 412 and cut meat product that may have been positioned in the input port 412. The fourth edge 408 has entered the dispensing port 414 and has begun to cut meat product that may be positioned in the dispensing port 414. The first edge 402, the second edge 404, the third edge 406 and the fourth edge 408 can move simultaneously with respect to other elements of the volumetric portioning apparatus 400.

Referring now to FIG. 6, the valve assembly 104 is in the second position. In this position, the first leg 422, the second leg 424 and the third leg 426 have rotated ninety degrees in a counter-clockwise direction. In other examples, the first leg, the second leg 424 and the third leg 426 can rotate to other positions relative to its initial position. For example, instead of rotating ninety degrees counter-clockwise, the first leg 422, the second leg 424 and the third leg can rotate two-hundred seventy degrees in the clockwise direction.

In the second position, the fourth edge 408 is located across the dispensing port 414 and has cut meat product that may have been located in the dispensing port 414. The first edge 402, the second edge 404 and the third edge 406 have continued to travel and maintain their relative positions to the first leg 422 and the second leg 424. In the second position, the second leg 424 and the third leg 426 are aligned with the portioning port 410 and the dispensing port 414, respectively, to allow meat product to be moved toward the output receiver (not shown).

The valve assembly 104 can move in an opposite direction from that previously described to move the first leg 422, the second leg 424 and the third leg 426 of the valve assembly 104 back to the first position. The first edge 404, the second edge 404, the third edge 406 and the fourth edge 408 can also be moved in an opposite manner as that previously described to cut the meat product that may be located in the portioning port 410, the input port 412 or the dispensing port 414 after the meat product is dispensed into the output receiver. The above sequence can also be repeated in reverse to return the valve assembly 104 to its original configuration.

Turning now to FIG. 7, another example valve assembly 700 is shown. The valve assembly 700 can be used in the volumetric portioning apparatus 100 as previously described. In this example, the valve assembly 700 can include an input flange 702, a portioning flange 704, and an output flange 706. As can be appreciated, the input flange 702, the portioning flange 704 and the output flange 706 can be used to connect the valve assembly 700 to the input hopper 102, the portioning assembly 106 and the output receiver 108, respectively. In other examples, the valve assembly 700 can have other connections to the other elements of the volumetric portioning apparatus 100.

The valve assembly 700 can be configured as a rotatable ball valve type assembly. The valve assembly can include an internal spherically-shaped ball (FIG. 8) that can be rotated from the first position to the second position. In the first position, the cavity of the ball can be positioned to fluidly connect the input port 712 to the portioning port 710. In the second position, the ball can fluidly connect the portioning port 710 to the output port 714. The ball can be moved from the first position to the second position by rotating the shaft 720 that can extend through the valve body 708 and be operatively connected to the ball that is contained inside the valve body 708.

As shown in FIG. 8, the valve assembly 700 can include a ball 800. The ball 800 is one example of the rotary portion 124 previously described. In this example, the ball 800 has a spherical shape with a cavity 802 defined therein. The cavity 802 can have any suitable shape such as the T-shape previously described and shown in FIG. 4. The ball 800 can include a notch 804. The shaft 720 can engage the notch 804 to move the ball 800 when the ball 800 is positioned inside a valve body, such as valve body 708. As can be appreciated, the actuator 110 (FIG. 1) can be operatively connected to the shaft 720 so that the actuator 110 can cause the ball 800 to move between a first position and a second position to alternate fluid connection of the input hopper 102 and the output receiver 108 with the portioning assembly 106.

In the example shown in FIG. 8, the ball 800 can also include a knife element 810. In this example, the knife element 810 is configured as a collar that surrounds a median portion of the ball 800. The knife element 810, in this example, has an outer profile that has a truncated spherical shape. With this configuration, the knife element 810 can spin or otherwise rotate on or about the outer surface of the ball 800 to cut meat product that may be positioned at one or more of the openings of the ball 800 before or concurrently with the rotation of the ball 800 inside the valve assembly 700. The knife element 810, in one example, can be formed of a suitable spring steel or stainless steel that can have a sharp edge at the openings of the ball 800. In other examples, other suitable materials can be used.

Referring now to FIG. 9, another example valve assembly is shown. In this example, the valve assembly 900 can be a ball valve type valve assembly. As shown, the valve assembly 900 can include a ball 902, a valve body 904, a portioning flange 906, an output flange 908, a connection assembly 910 and a knife element 912. The valve assembly 900 can be similar in many respects to the valve assembly 700 previously described. In addition, the ball 902 can be similarly configured as that previously described with respect to ball 800. For example, the ball 902 can have a T-shaped cavity. The cavity of the ball 902 can operate to allow the input port (not shown) to be fluidly connected to the portioning port 920. When the ball 902 is rotated from the first position to the second position, the ball 902 can be positioned as shown in FIG. 9. In this second position, the portioning port 920 can be fluidly connected to the output port 922.

As shown, the ball 902 can be retained in position in the valve body 904 to allow the ball 902 to rotate about an axis 924. The ball 902 can be operatively connected to an actuator, lever or other device to allow the ball 902 to be rotated about the axis 924. As shown, the connection assembly 910 can be coupled to the valve body 904 and include a shaft 926 that can engage the ball 902 to cause the ball to rotate.

As further shown, the ball 902 is positioned inside the valve body 904 with sufficient clearance to allow the knife element 912 to be positioned adjacent the ball 902. The knife element 912, in this example, is positioned on sides of the ball 902 away from the path of flow of the meat product when the valve assembly 900 is in operation as part of the volumetric portioning apparatus 100. The knife element 912 in this example can move from the seated position (as shown in FIG. 9) in a direction toward the portioning port 920 and/or the output port 922. As the knife elements 912 move in the direction indicated by the arrows on FIG. 9, the knife elements 912 can cut through pieces of meat product that may bridge across from the portioning port 920 and into the ball 902. Similarly, the knife elements can also move in the direction indicated by the arrows to cut through pieces of meat product that may bridge across from the output port 922 and into the ball 902. After the knife elements 912 have cut through the bridging pieces of meat product, the ball 902 is free to rotate about the axis 924.

In the example shown, the knife elements 912 are shown as being positioned on opposite sides of the ball 902. In other examples, the knife element(s) 912 can be positioned at other positions or include more or less than the quantity of knife elements shown in FIG. 9.

Turning now to FIG. 10, another example valve assembly is shown. In this example, the valve assembly 1000 can be a diverter type valve. The valve assembly 1000 can be positioned as part of the volumetric portioning apparatus 100. The valve assembly 1000 can have a Y-shape with two ports positioned on one side of the valve assembly 1000 and a single port located on an opposite side of the valve assembly 1000. In the example shown, the valve assembly can include an input port 1002, an output port 1004 and a portioning port 1006. The portioning port 1006 and the output port 1004 can be substantially aligned in a linear direction. The input port 1002 can be disposed at an oblique angle to the portioning port 1006 and/or the output port 1004.

The valve assembly 1000 can further include a diverter plate 1010. The diverter plate 1010 can operate to alternatively open a flow path for meat product to flow from the input port 1002 into the portioning port 1006 or from the portioning port 1006 into the output port 1004. In this example, the diverter plate 1010 is a circular disc of rigid material such as steel, stainless steel or the like. The diverter plate 1010 can define an opening 1012. The diverter plate 1010 can rotate inside the cavity of the valve assembly 1000 to move the opening 1012 from the position as shown in FIG. 10 to a position aligned with the portioning port 1006 and the output port 1004.

The diverter plate 1010 can further include a knife element or knife edge 1016. The opening 1012 can include a sharpened, beveled or other edge that can allow the knife element 1016 to cut through pieces of meat product that may be bridged across the opening 1012 that would otherwise prevent the diverter plate 1010 from rotating in the valve assembly 1000. As shown in FIGS. 11A and 11B, the knife element 1016 can be an edge located in the center of the opening 1012. In other examples, the knife element 1016 can be positioned at either surface of the diverter plate 1010. In still other examples, the valve assembly 1000 can include a separate knife element 1016 and/or a second plate that can operate as the knife element to cut pieces of meat product inside the cavity of the valve assembly 1000.

The valve assembly 1000 can also include an arm 1014. The arm 1014 can be connected to the actuator (not shown in FIG. 10) of the volumetric portioning apparatus 100. In this manner, the actuator 110 can operate to move the diverter plate from the first position (as shown in FIG. 10) to the second position and back again during filling and dispensing of meat product from the volumetric portioning apparatus 100 that includes the valve assembly 1000.

In still another example, the valve assembly of the volumetric portioning apparatus 100 can include a diverter type valve assembly that includes a rectangular diverter plate. The valve assembly, in this example, can be configured similarly to the valve assembly 1000 but the internal cavity of the valve assembly can operate to accept a diverter plate with a shape as that shown in FIGS. 12A and 12B. In this type of valve assembly, the diverter plate 1210 includes an opening 1212 that can operate to slide or translate between the first position and the second position to fluidly connect either the input port to the portioning port or the portioning port to the output port as previously described. The diverter plate 1210 can further include a knife element 1216 to cut meat product away from the opening 1212 to allow the unhindered movement of the diverter plate 1210 in the valve assembly.

In yet another example, multiple elements of the volumetric portioning apparatus 100 can be coupled and operated together to further enhance the speed and cost-effectiveness of the portioning process. As can be appreciated, the examples previously described discuss a process in which the volumetric portioning apparatus operates in either a filling operation or in a dispensing operation with the volumetric portioning apparatus 100 alternating between such discrete operations. The volumetric portioning apparatus, in other examples, can couple multiple elements together to allow for the continuous input of meat product and the continuous dispensing of measured quantities of meat product.

As shown in one example in FIG. 13, a volumetric portioning apparatus 1300 can include a first valve assembly 1302, a second valve assembly 1304, a third valve assembly 1308, a first portioning assembly 1306 and a second portioning assembly 1310. The first valve assembly 1302, the second valve assembly 1304 and the third valve assembly 1308 can operate and move in a coordinated manner to allow the first portioning assembly 1306 to be filling with meat product while the second portioning assembly 1310 is dispensing meat product. In a second operational position, the second portioning assembly 1310 can be filling with meat product while the first portioning assembly 1306 can be dispensing meat product. As such, the volumetric portioning apparatus 1300 can be continuously operating to dispense measured and/or portioned meat product.

As shown, the volumetric portioning apparatus 1300 is configured in the first operational position. In this position, an input pathway is defined from the input hopper through the first valve assembly 1302, through the second valve assembly 1304 and into the first portioning assembly 1306. In the first operational position, meat product can flow into the first portioning assembly 1306 as the first piston 1314 moves upward. As the first portioning assembly 1306 is filling with meat product, the second portioning assembly 1310 is causing meat product to flow through the third valve assembly 1308 and into an output receiver. The second piston 1316 can be moving downward to force the meat product out of the second portioning assembly 1310 and through the third valve assembly 1308.

When the first portioning assembly 1306 is in a filled condition and the second portioning assembly 1310 is in an empty condition, the first valve assembly 1302, the second valve assembly 1304 and the third valve assembly 1308 can move (e.g., rotate) to the second operational position. The second operational position can be a position in which each of the first valve assembly 1302, the second valve assembly 1304 and the third valve assembly 1308 have each rotated ninety degrees counter-clockwise (as indicated by the arrows in FIG. 13). In other examples, the valve assemblies can move or rotate in other manners or to greater or less extents as previously described.

In the second operational position, the meat product can flow from the input hopper through the first valve assembly 1302, through the third valve assembly 1308 and into the second portioning assembly 1310. At the same time, the meat product can flow out of the first portioning assembly 1306, through the second valve assembly 1304 and to the output receiver.

The first valve assembly 1302, the second valve assembly 1304 and the third valve assembly 1308 can include a first knife element 1320, a second knife element 1322 and a third knife element 1324, respectively. The first knife element 1320, the second knife element 1322 and the third knife element 1324 can move in the respective valve assemblies to cut pieces of meat product that may be bridging across moving elements of the valve assemblies. In this manner, the first knife element 1320, the second knife element 1322 and the third knife element 1324 can remove obstacles and prevent the damage or clogging of the volumetric portioning apparatus 1300.

As can be appreciated, the volumetric portioning apparatus 1300 can alternate between the first operational position and the second operational position to continuously dispense measured and/or portioned meat product.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

We claim:

1. A volumetric portioning apparatus comprising:
   a valve assembly operable in a first position and a second position, the first position allowing a food product to flow from an input hopper through the valve assembly and into a portioning assembly, the second position allowing the food product to flow from the portioning assembly, through the valve assembly and into an output receiver;
   an actuator coupled to the valve assembly and operable to move the valve assembly from the first position to the second position; and
   a knife element operable to automatically cut the food product to prevent the food product from limiting movement of the valve assembly from the first position to the second position.

2. The volumetric portioning apparatus of claim 1 wherein the valve assembly includes a rotary portion and a stationary portion.

3. The volumetric portioning apparatus of claim 2 wherein the rotary portion includes a ball valve.

4. The volumetric portioning apparatus of claim 3 wherein the knife element includes a blade connected to the ball valve.

5. The volumetric portioning apparatus of claim 3 wherein the knife element comprises a first blade mounted on the ball valve and a second blade mounted on the stationary portion of the valve assembly, wherein the first and second blades move in opposite directions.

6. The volumetric portioning apparatus of claim 2 wherein the knife element includes a blade connected to the stationary portion of the valve assembly.

7. The volumetric portioning apparatus of claim 2 wherein the actuator moves the rotary portion of the valve assembly approximately 90 degrees between the first and the second positions.

8. The volumetric portioning apparatus of claim 1 wherein the valve assembly comprises a first port operatively connected to the input hopper, a second port operatively connected to the portioning assembly, and a third port operatively connected to the output receiver, and wherein at least two of the first, second, and third ports includes a knife element.

9. The volumetric portioning apparatus of claim 1 wherein the portioning assembly measures a volume or a weight of the food product.

10. The volumetric portioning apparatus of claim 9 wherein the food product is whole muscle meat.

11. The volumetric portioning apparatus of claim 10 wherein the weight of the food product is greater than or equal to 1 pound.

12. The volumetric portioning apparatus of claim 10 wherein the weight of the food product is between 5 pounds and 20 pounds.

13. The volumetric portioning apparatus of claim 1 further comprising a controller operatively connected to the portioning assembly, the actuator, and the hopper.

14. The volumetric portioning apparatus of claim 13 wherein the controller is further connected to the knife element.

15. A method of portioning a food product comprising:
  moving the food product from an input hopper through a valve assembly and into a portioning assembly, the valve assembly operating in a first position;
  cutting the food product to prevent the food product from limiting movement of the valve assembly from the first position to a second position;
  moving the valve assembly from the first position to a second position; and
  moving the food product from the portioning assembly through the valve assembly and into an output receiver, the valve assembly operating in the second position.

16. The method of portioning a food product of claim 15 wherein an actuator moves a rotary portion of the valve assembly approximately 90 degrees between the first and the second positions.

17. The method of portioning a food product of claim 15 further comprising measuring a volume or a weight of the food product in the portioning assembly.

18. The method of portioning a food product of claim 15 wherein the food product is whole muscle meat.

19. The method of portioning a food product of claim 18 wherein the weight of the food product is greater than or equal to 1 pound.

20. A volumetric portioning apparatus comprising:
  a first, a second, and a third valve assembly each operable in a respective first position and a respective second position;
  the first valve assembly allowing a food product to flow from a first input port into a first portioning assembly when in the first position and allowing the food product to flow from the first portioning assembly to a first output receiver when in the second position;
  the second valve assembly allowing the food product to flow from a second input port into a second portioning assembly when in the first position and allowing the food product to flow from the second portioning assembly to a second output receiver when in the second position;
  the third valve assembly allowing the food product to flow from an input hopper to the first input port when in the first position and allowing the food product to flow from the input hopper to the second input port when in the second position;
  an actuator coupled to the first, the second, and the third valve assemblies and operable to move the first, second, and third valve assemblies simultaneously from the respective first positions to the respective second positions; and
  a first, a second, and a third knife element operable to automatically cut the food product to prevent the food product from limiting movement of the first, the second, and the third valve assemblies, respectively, from the respective first positions to the respective second positions.

* * * * *